United States Patent [19]

Baines

[11] Patent Number: 4,769,627
[45] Date of Patent: Sep. 6, 1988

[54] ARMATURE COIL COMMUTATOR CONNECTOR

[75] Inventor: Roger F. Baines, Repulse Bay, Hong Kong

[73] Assignee: Johnson Electric Industrial Manufactory, Limited, Chaiwan, Hong Kong

[21] Appl. No.: 79,019

[22] Filed: Jul. 29, 1987

[30] Foreign Application Priority Data

Dec. 11, 1986 [GB] United Kingdom ............. 8629624

[51] Int. Cl.$^4$ ........................................ H02K 13/04
[52] U.S. Cl. ................................ 310/71; 310/234; 439/401
[58] Field of Search ............... 310/71, 233, 234, 236; 439/391, 395, 396, 401

[56] References Cited

U.S. PATENT DOCUMENTS

| | | | |
|---|---|---|---|
| 3,854,114 | 12/1974 | Kloth et al. | 439/395 |
| 4,557,544 | 12/1985 | Esser | 439/395 |
| 4,584,498 | 4/1986 | Strobl | 310/236 |
| 4,653,830 | 3/1987 | Pegram | 439/395 |
| 4,656,380 | 4/1987 | Strobl | 310/236 |

FOREIGN PATENT DOCUMENTS

| | | | |
|---|---|---|---|
| 2438178 | 3/1975 | Fed. Rep. of Germany | 439/391 |
| 197807 | 7/1978 | United Kingdom | 439/391 |

Primary Examiner—Patrick R. Salce
Assistant Examiner—D. L. Rebsch
Attorney, Agent, or Firm—Fleit, Jacobson, Cohn & Price

[57] ABSTRACT

An armature comprises a winding having a connector portion coated with insulation, an armature termination, such as a commutator segment, and a support on which the termination is mounted. The termination has an integral terminal provided with a slot which straddles and grips the connector portion of the winding. The slot has an open end through which the winding is drawn after the termination has been mounted on the support. During an armature winding operation, two cutting edges cut through the insulation of the connector portion as it is drawn into the slot to establish electrical contact between the connector portion and the terminal.

7 Claims, 2 Drawing Sheets

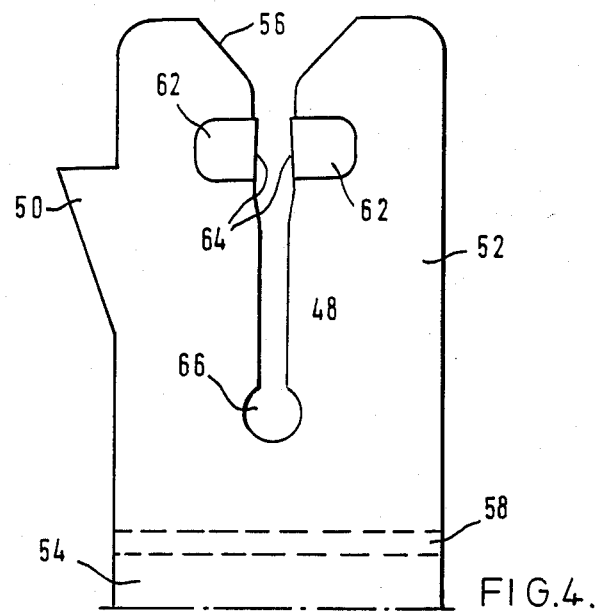
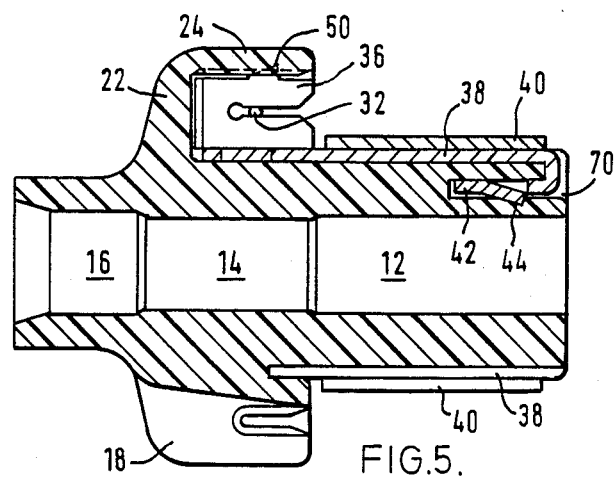

ARMATURE COIL COMMUTATOR CONNECTOR

INTRODUCTION

This invention relates to an armature for an electrical device and to a method of connecting an armature winding to an armature termination, the armature termination being connectable to an external circuit.

BACKGROUND

In the manufacture of an armature for an electrical device it is necessary to provide an electrical connection between the armature and the commutator or slip ring which is used for effecting electrical contact between the armature winding and an external circuit.

In our British Pat. No. 2128828B (U.S. Pat. No. 4,584,498) we describe a connection between the armature winding and armature termination which avoids the application of heat to effect the connection and which utilizes the principle of insulation displacement in which a wire having an insulating cover is forced into a slot narrower than the wire diameter to form a clean metal-to-metal contact between the wire and a terminal portion of the armature termination.

When a commutator is employed it is sometimes advantageous to assemble the commutator before making the connections between the armature winding and the commutator, as the commutator can then be ground in isolation from the armature.

While the connection described in our aforementioned British Patent has many advantages over previously used armature termination connections, it does not allow assembly of a commutator prior to connection to the armature.

SUMMARY OF INVENTION

With a view to mitigating this drawback, the present invention provides, in a first aspect, an armature comprising a winding having a connector portion coated with insulation, an armature termination, and a support on which said termination is mounted, said termination having an integral terminal provided with a slot which straddles and grips said connector portion, the slot having an open end for receiving a connector portion of said armature winding after the armature termination has been mounted on said support and two cutting edges for cutting through the insulation of the connector portion as it is drawn into the slot to establish electrical contact between the connector portion and the terminal, the slot maintaining said electrical contact as it straddles and grips said connector portion.

According to a second aspect of the invention there is provided a method of connecting an armature winding to an armature termination, the armature termination being connectable to an external circuit, comprising the steps of providing the termination with an integral terminal, the terminal having a slot open at one end and two cutting edges, mounting the termination on a support, and subsequently winding the armature, wherein the winding includes a connector portion coated with insulation and wherein said connector portion is drawn into the slot during winding of the armature, so that the cutting edges cut through the insulation of the connector portion, and the slot straddles and grips the connector portion to maintain electrical contact between the connector portion and the terminal.

BRIEF DESCRIPTION OF THE DRAWINGS

The invention will now be more particularly described, by way of example, with reference to the accompanying drawings, in which:

FIG. 4 is an enlarged view of a portion of the termination shown in FIG. 2, and FIG. 5 is a sectional view of the termination support of FIG. 1 with a termination mounted thereon and with an armature winding connected thereto.

DESCRIPTION OF PREFERRED EMBODIMENTS

Figure 1:
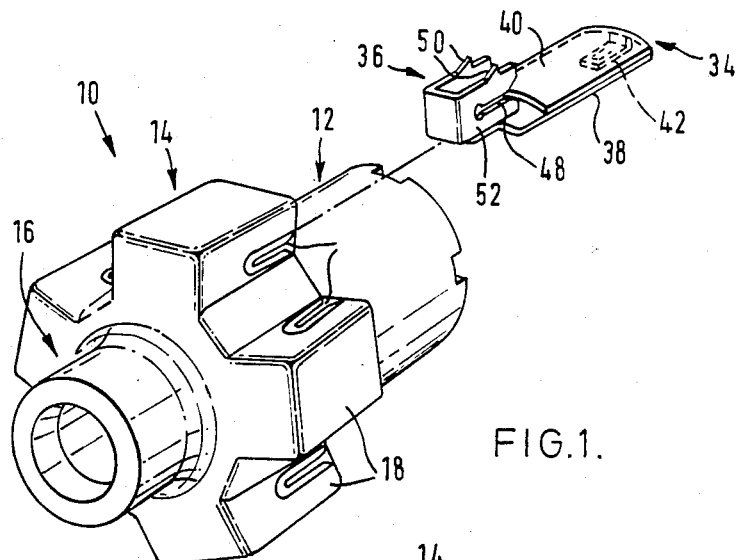
FIG. 1 is an exploded perspective view of a termination and a termination support of one embodiment of an armature according to the invention, the termination being in the form of a commutator segment.
Figure 2:
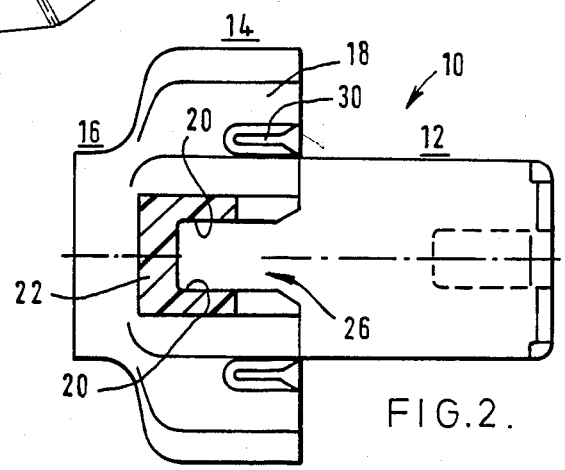
FIG. 2 is a plan view of the termination support of FIG. 1, partially sectioned to illustrate the configuration of one of the housings of the termination support.

FIGS. 1, 2 and 5 show a unitary plastic molded termination support 10. The support 10 has three sections, 12, 14 and 16, and is essentially a hollow cylinder with additional structures provided on its external surface, in its middle section 14. The shaft of an armature (not shown) passes through the support 10 and the portion 16 is a spacer which spaces the middle section 14 of the body 10 from the base of the armature stacks (not shown).

The middle portion 14 of the body 10 has five housings 18 equally spaced around the circumferance of the support 10.

Section 12 of the support 10 provides support for the commutator segments.

One of the housings 18 is best shown in section in FIGS. 2 and 5. The housing 18 has side walls 20, an end wall 22 and a cover 24. The end wall 22 is adjacent the spacer 16 and an opening 26 which faces the commutator support 12 is provided by the walls 20, 22 and cover 24. The side walls 20 are parallel with the longitudinal axis of the support 10. Each side wall 20 of the housing 18 has a slot 30 which extends parallel to the longitudinal axis of the support 10, from the commutator end of the housing 18.

Figure 3:
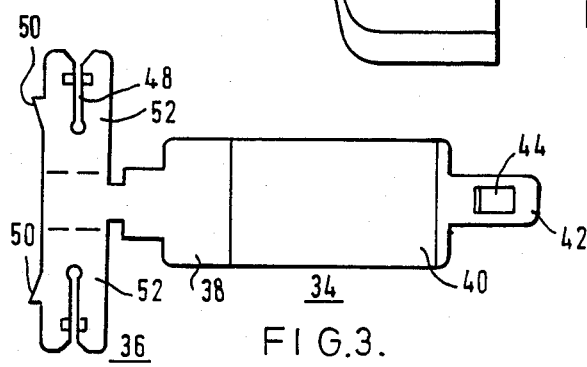
FIG. 3 is a plan view of one of the terminations of FIG. 1 in blank form.

A combined commutator segment 34 and terminal 36 are illustrated in FIG. 3 in the form of a blank. The commutator segment 34 has a base 38 which carries an overlay 40. A lug 42 of reduced width is provided at the front end of the base 38 and the lug 42 has a central struck-up tag 44. Two lugs 42 could be provided, if desired, adjacent opposite edges of the segment 34.

At its rear end, the base of the commutator segment 34 is connected to the terminal 36. The terminal 36 is rectangular, with its minor axis coincident with the longitudinal axis of the commutator segment 34. The terminal 36 has two key-hole shaped slots 48 extending from opposite ends of the terminal 36 along the major axis thereof. A triangular barb 50 is provided on either side of the minor axis of the terminal 36 along the edge furthest from the commutator segment 34.

As can be seen from FIG. 1, the base 38 and the overlay 40 of the commutator segment 34 are of arcuate form which conforms to the external radius of the commutator support section 12 of the body 10. The lug 42 extends below the base 38 and back along the length of the commutator section 34 with the tag 44 projecting below the lug 42. Terminal 36 is bent upright from the commutator segment 34 and the arms 52 of the terminal 36, which include the respective key hole shaped slots 48, are bent at 90° to the central portion 54 of the terminal. The arms 52 therefore extend parallel to each other and to the longitudinal axis of the commutator segment 44, and forward along the length thereof.

FIG. 4 shows one half of the terminal 46 of FIG. 3, on an enlarged scale. Areas 58 are shown in which bending occurs between the central portion 54 and the arm 52. However, the main purpose of FIG. 4 is to illustrate the detailed structure of the key-hole shaped slots 48. It is this feature which ensures contact with an armature winding portion 32, seen in FIG. 5. The tapered mouth 56 provides a funnel for guiding the winding portion 32 into the slot 48. A short distance into the slot 48 there are located two cutters 62 which have sharp edges 64 projecting into the slot 48. Preferably, the cutters 62 are formed by a precise stamping operation. Alternatively, as shown, the cutters 62 are formed from the arm 52 and partially severed therefrom, such that the sharp edges 64 are resiliently urged into the slot 48. Along the slot 48, behind the cutters 62, there is a further small reduction in width. Circular end 66 of slot 48 ensures that the edges of the slot 48 have a certain resilience to separation by the winding portion 32.

FIG. 5 shows shaped commutator segment 34 and the terminal 36 in position on the support 10. The terminal 36 is received in and supported by the housing 18.

The barb 50 grips the cover 24 of the housing 18 and therefore retains the terminal 36 within the housing 18. Further retention is provided if the width of the terminal 36 is a close fit to the internal dimensions of the housing 18.

The front end of the support 10 is provided with five longitudinal recesses 70 which are cut away at the forward ends so as to meet the curved external surface of the commutator supporting section 12. Lug 42 of cummutator segment 34 enters the recess 70 as the terminal 36 enters the housing 18. Tag 44 of lug 42 is forced into the material of the support 10 so as to rigidly restrain the lug 42 within recess 70. Commutator segment 34 is rigidly held in position on the supporting section 12 by interaction of terminal 36 and housing 18 at one end and by interaction of lug 42 and tag 44 with recess 70 at its other end. The commutator segment 34 is rigidly held on supporting section 12 and there is no fear of displacement even during high rotational acceleration. All five commutator segments 34 are mounted on the support 10 in this way. The support 10, together with the commutator segments 34, can then be mounted in a jig and the commutator segments 34 ground down to provide a right cylindrical surface for presentation in use to brush gear.

The support 10 is then mounted on an armature shaft (not shown) with the spacer 16 pushed against an armature stack. The armature is then placed in a winding jig, and the armature coils and wound using, for example, enamel coated copper wire. The lead wire of the armature winding is inserted in the slots 48 and slots 30 in one of the terminals 36 and its respective housing 18. As the lead wire is drawn into slots 48, the sharp edges 64 of the cutters 62 sever the insulation on the wire 32 which is deformed as the wire is drawn further into the slots 48, the slots 48 being narrower than the diameter of the wire. The slots 30 terminate short of the ends of slots 48 to prevent the wire 32 from entering the circular ends 66 of the slots 48. Thus intimate metal to metal contact is maintained between the wire 32 and the terminal 36, the arms 52 of the terminal 36 acting as double cantilever springs and exerting a continuous pressure on the wire 32.

From this start, the first armature coil is wound. At the end of the first coil winding the armature is indexed and the wire 32 is drawn into slots 48 and slots 30 in the next terminal 36 and housing 18 without breaking the continuity of the wire. The winding machine is arranged to do this automatically.

The process is repeated until all coils have been wound and the tail end of the winding is drawn into the slots 48 and slots 30 of the first terminal and housing until it is adjacent to the lead end. The wire 32 is then cut and the armature removed from the winding machine.

The material of the base 38 of the commutator segment 34 is brass or other metal having similar properties for providing the resilience required for the terminal 36 and lug 42. The overlay is formed of copper which provides the properties necessary for its commutation function. In operation the overlay 40 will be directly contacted by the brushes of the electric motor.

The invention provides a simple and cheap connection between the armature winding and the commutator. No application of heat is required and the associated risk of distorting the body 10 is therefore avoided. No embrittlement of the winding wire is caused and problems associated with oxidation are also avoided. The use of flux is negated and there is no chemical reaction or consequent corrosion resulting from the connection.

The above embodiment is given by way of example only and various modifications will be apparent to persons skilled in the art without departing from the scope of the invention defined by the appended claims.

For example, the housing 18 are by no means essential, although some support for the terminal 36 is desirable. If the housings 18 are omitted either the circular ends 66 of the slots 48 must be omitted or some means must be provided to prevent the wire 32 from entering these circular ends 66.

The terminal 36 may be designed with only one arm 52. The commutator segments 34 need not be bimetallic. The commutator segments could be bonded to the support section 12 and the spacer 16 may include formations co-operating with complementary formations on the winding stacks, so as to prevent angular displacement between the support 10 and the armature stacks. The wire of the armature may be formed of a material such as aluminum instead of copper and various sizes of wire can be accommodated. The support 10 could be of metal, e.g. aluminum, provided with an insulating layer of metal oxide. Moreover, instead of cutters 62 the edges of the slots 48 could be serrated. Also instead of the barrel commutator shown, the commutator may be a face commutator with the commutator segments arranged in a single plane perpendicular to the axis of the armature.

Furthermore, the armature terminations could be in the form of slip rings rather than commutator segments.

What is claimed is:

1. An armature comprising a winding having a connector portion coated with insulation, an armature termination, and a support on which said termination is mounted, said termination having an integral terminal provided with a slot which straddles and grips said connector portion, the slot having an open end for receiving a connector portion of said armature winding after the armature termination has been mounted on said support and two cutting edges for cutting through the insulation of the connector portion as it is drawn into the slot to establish electrical contact between the connector portion and the terminal, the slot maintaining said electrical contact as it straddles and grips said connector portion.

2. An armature as claimed in claim 1, wherein said terminal has at least two parallel arms each having a slot which straddles and grips said connector portion.

3. An armature as claimed in claim 2, wherein said two arms are connected by a transverse portion.

4. An armature as claimed in claim 1, wherein the support includes a housing for said terminal.

5. An armature as claimed in claim 4, wherein said terminal is provided with a barb for retaining said terminal in said housing.

6. An armature as claimed in claim 1, wherein there are three or more armature terminations in the form of commutator segments fixed to said support.

7. An armature as claimed in claim 1, wherein the open end of said slot faces away from said armature winding.

* * * * *